INVENTOR.
BELA L. ROMVARI
BY Edward M. Fussell
ATTORNEY

INVENTOR.
BELA L. ROMVARI
BY Edward M. Farrell
ATTORNEY

United States Patent Office 3,122,687

Patented Feb. 25, 1964

3,122,687
SERVO CONTROL SYSTEM

Bela L. Romvari, Philadelphia, Pa., assignor to Sperry Rand Corporation, New York, N.Y., a corporation of Delaware Filed Aug. 24, 1960, Ser. No. 51,725
7 Claims. (Cl. 318—28)

This invention relates to servo systems, and more particularly to servo systems for positioning a head carrying carriage over a selected portion of a magnetic drum.

Magnetic drums which include a large number of information tracks have been used extensively as memory storage devices. In many systems, it has proven advantageous to use one magnetic head to read and write information in connection with a number of information tracks.

When a single head is used in connection with more than one information track, it is necessary to selectively change the position of the head from time to time for reading or writing operations involving different tracks addresses.

The present invention is related to a system for positioning a magnetic head over selected information track of a magnetic drum where the positioning is achieved by the use of servo mechanisms which include a motor for driving the head carrying carriage to a desired position in accordance with an applied address signal. Such servo mechanisms are generally designed to operate on an error voltage which is representative of the position of the magnetic head and the position being sought by the magnetic head during a positioning operation. As the magnetic head approaches the selected position, the error voltage is gradually reduced until it reaches zero, at which point the motor driving the carriage becomes inoperative.

In order to find the breakpoint in an on-off control system and to provide damping of the head carrying carriage movement when it approaches a new selected position, a velocity voltage, representative of the velocity of the head carrying carriage, may be applied to the servo mechanism. The velocity voltage is combined with the error positioning voltage and is opposite in phase. The breakpoint is a zero voltage condition or that point at which the combined voltage changes in phase.

During the initial positioning operation of the carriage, it is desirable to have the carriage move at a maximum speed with due consideration being given to the mechanical aspects involved. Then at a proper distance away from the new selected position maximum deceleration is to be applied to bring the carriage to a stop.

In order to achieve high positioning speed at a relatively high positioning accuracy, it is necessary to employ a saturated servo system involving high gain during the final portion of the positioning operation. High gain servo systems are often accompanied by attendant problems relating to the creation of mechanical vibration or oscillation within the system.

It is also desirable in servo systems to achieve high natural frequency of the servo mechanism system which should be comparable to the alternating current carrier frequency used to drive the various motors associated with servo systems. In many cases, a 60 cycle signal is the carrier signal which is most readily available to drive a servo mechanism. When a 60 cycle carrier frequency is used, designing a mechanical system for high gain with the proper natural frequency is often a problem. The natural frequency is defined as that frequency at which an element or combination of elements will tend to vibrate or oscillate.

It is an object of this invention to provide a high gain stable servo system for positioning a magnetic head carrying carriage which operates at high efficiency.

It is still a further object of this invention to provide a stable servo system which has a natural frequency comparable to the carrier frequency.

It is still a further object of this invention to use a very simple servo control logic related with saturated type servos, applicable to particular types of positioning systems.

In accordance with the present invention, a stable servo mechanism is provided for positioning a magnetic head carrying carriage. The servo mechanism includes a motor which is actuated by a combined error voltage attained by summing a velocity voltage and an error positioning voltage. The combined voltage is applied to a limiter with the output voltage from the limiter being applied to the motor to drive the carriage. A filter circuit is associated with the limiter and serves to damp high frequency oscillations which normally tend to be generated in high gain servo loop systems.

Other objects and advantages of the present invention will be apparent and suggest themselves to those skilled in the art to which the present invention is related, from a reading of the following specifications and claims, in conjunction with the accompanying drawings, in which:

Figure 1:
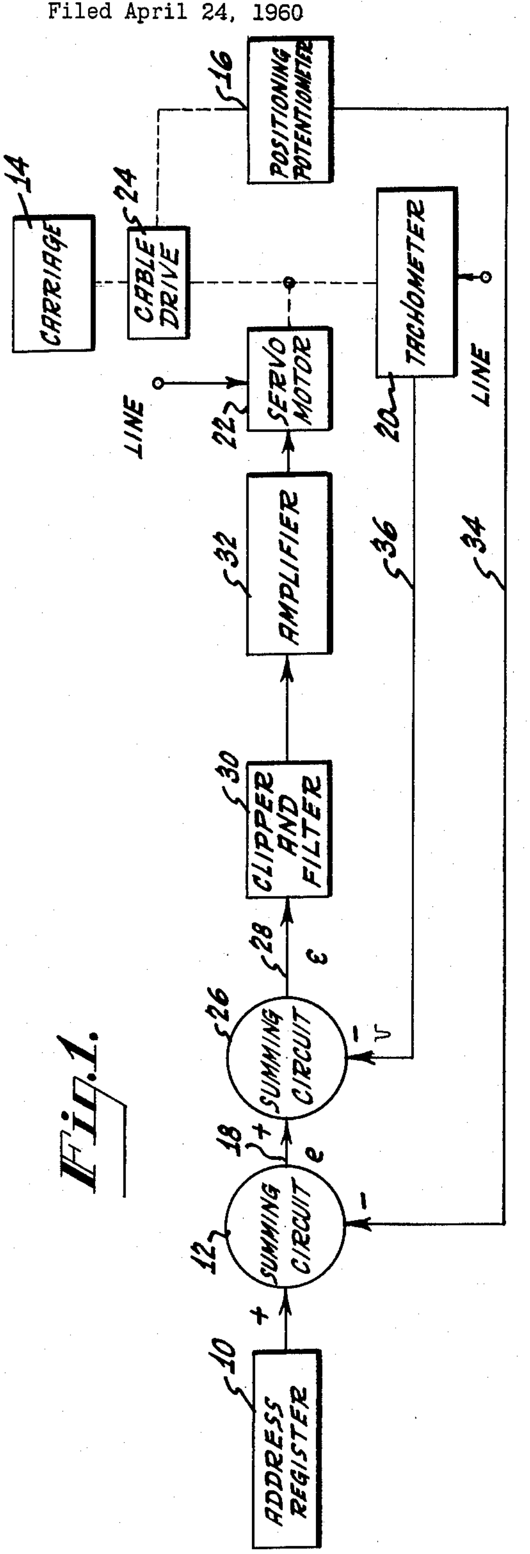
FIGURE 1 is a block diagram illustrating a servo system, in accordance with the present invention.

Referring particularly to FIGURE 1, an address voltage signal from a source 10 is applied to a summing circuit 12. The address signal may be from an address register in a computing system, for example, and may represent a track on a magnetic drum to which it is desired to drive a carriage 14 before starting a reading or writing operation. The carriage 14 is driven by a servo motor 22 through a cable drive 24. The operation and speed of the motor 22 is dependent upon the amplitude of a voltage applied thereto.

The actual position of the carriage 14 during a positioning operation is represented by a voltage from a position potentiometer 16. This voltage is proportional to the positions of the carriage. The output voltage from the positioning potentiometer 16 is applied along with address voltage from the source 10 to a summing circuit 12. The two applied voltages to the summing circuit 12 are opposite in phase. The difference between the two applied voltages represents an error positioning voltage which is developed at the line 18. The error positioning voltage E at the line 18 may be considered as a voltage representative of the actual position of the carriage 14 and the position being sought by the carriage 14 during a positioning operation. A zero error signal will be produced when the voltage from the positioning potentiometer 16 is equal to the address signal voltage at the source 10.

As was previously mentioned, it is desirable to provide a damping voltage within a servo system when the carriage approaches its selected position. A tachometer 20 is associated with the servo motor 22 to produce a voltage corresponding to its velocity. The motor 22 drives the carriage 14 through various mechanical connections which may include the cable drive 24. Because the carriage speed is dependent upon the motor speed, the voltage from the tachometer 20 may be considered as a velocity voltage representative of the velocity of the carriage 14. It is this velocity voltage which is used for damping during the final carriage positioning. The same velocity signal is also used with the error positioning signal to detect breakpoints.

The error positioning voltage at the line 18 is applied to a second summing circuit 26 together with the velocity voltage from the tachometer 20. The error positioning voltage and the velocity voltage are opposite in phase. A combined voltage E, equal to the difference between the error positioning and velocity voltages, is produced at the line 28.

The voltage at the line 28 is applied to a clipper and filter network 30. This circuit is illustrated in detail in FIGURE 2. The output voltage from the network 30 is applied through an amplifier 32 to drive the servo motor 22.

The present invention is related to the clipper and filter network 30, which provides means for switching the A.-C. signal without time delay between the saturated and linear operating regions, limiting the amplitude of the voltage driving the motor 22, and to provide means to permit high gain within the servo feed-back loops during the final positioning operation of the carriage. The saturated and linear operating regions referred to are more clearly illustrated in FIGURE 4 with the A.-C. signal representing the combined error positioning and velocity voltages.

Figures 3, 4:
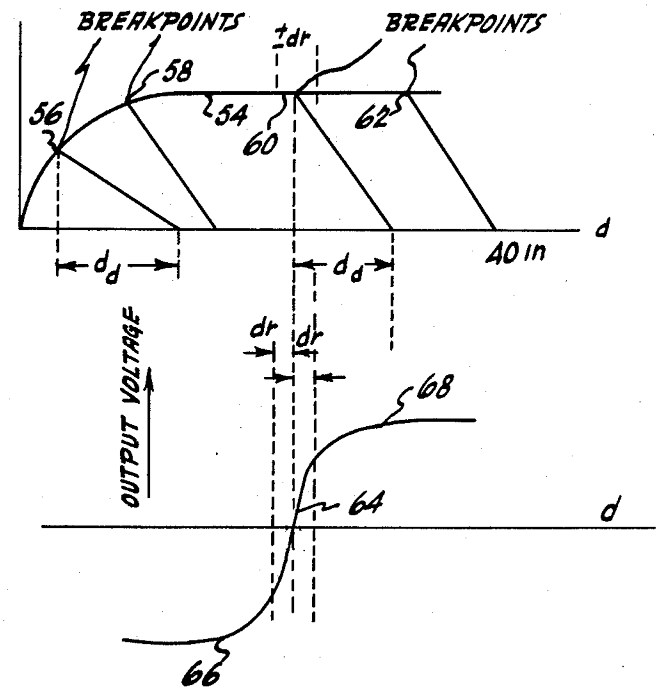
FIGURE 3 is a curve illustrating velocity voltage versus traveling distance of a carriage, in accordance with the present invention, shown for purposes of explanation.
FIGURE 4 is a curve illustrating an output voltage versus distance from a limiter when a carriage is approaching a breakpoint or a final position, in accordance with the present invention, shown for purposes of explanation.

For purposes of explanation, the loop associated with the line 34 may be considered as the main feed-back servo loop, and the loop associated with the line 36 may be considered as the auxiliary feed-back servo loop. Also, as will be explained, the velocity voltage at the line 36 may have a characteristic as illustrated in FIGURE 3, and the voltage at the line 28 may have a characteristic as illustrated in FIGURE 4, under certain operating conditions, as will be described.

Figure 2:
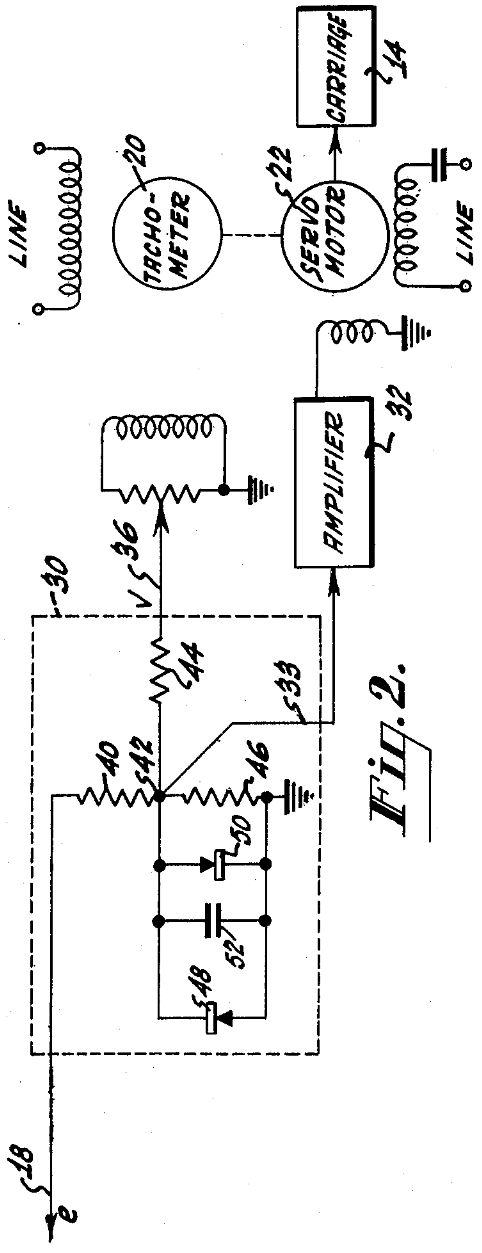
FIGURE 2 is a schematic diagram, partly in block diagram form, illustrating the present invention in greater detail.

Referring particularly to FIGURE 2, the clipper and filter network 30 and summing circuit 26 are illustrated in greater detail. In considering this circuit, it is noted that only the auxiliary servo loop involving the line 36 and the line 18 of FIGURE 1 are involved.

The error positioning voltage is applied from the line 18 through resistor 40 to a summing point 42. The velocity voltage from the line 36 is also applied to the summing point 42 through a resistor 44. The error positioning voltage and velocity voltages are applied across a load resistor 46 to produce a combined voltage.

The combined or difference voltage, being the difference between the velocity and error positioning voltages, developed across the resistor 46 is applied through the amplifier 32 to the motor 22 to drive the carriage 14. The tachometer 20, responsive to the speed of the motor 22, produces the velocity voltage, as described in connection with FIGURE 1.

A clipping circuit, comprising a pair of diodes 48 and 50, is connected across the load resistor 46. A capacitor 52 forms a filter network which is also connected across the load resistor 46.

The diodes 48 and 50 are connected to each other in polarity opposition, i.e. the anode of each of the diodes is connected to the cathode of the other diode. The diodes 48 and 50 are normally non-conductive until a voltage exceeding a predetermined level is applied thereto. When a voltage exceeding a predetermined level is applied thereto one of the diodes becomes conductive, the one becoming conductive being dependent upon the polarity of the applied voltage. For example, when the voltage at the summing point 42 is positive and exceeds a predetermined amplitude, the diode 50 becomes conductive and the diode 48 is non-conductive. The voltage applied to the amplifier 32 from the resistor 46 is therefore limited, since the diode 50 provides a low impedance path when it is conducting. Likewise, when the voltage at the summing point 42 is negative and exceeds a predetermined amplitude, the diode 48 becomes conductive and the diode 50 is non-conductive. The negative voltage applied to the amplifier 32 is again limited since the diode 48 provides a low impedance path when it is conductive.

The diodes 48 and 50 may be considered as a form of switching circuit. When the voltage at the point 42 is of either positive or negative polarity with respect to ground and is below a certain amplitude, the characteristics of the diodes 48 and 50 are such that they remain substantially non-conducting and may be considered as effectively out of the circuit. Such diodes having the characteristic of remaining non-conductive until a predetermined voltage is applied thereacross are well known. Various biasing resistors may be connected to the diodes if desired to attain different clipping levels, such techniques being well known.

It should be noted that some change of diode characteristics will occur with variation of ambient temperature. Using diodes of commercially available type, it has been found that variation of the ambient from 20° C. to 60° C. will cause a variation of 0–2% over-shoot in the full travel length. Since the diodes are matched and the power amplifier is of stable gain type, the resulting overshoot is not large enough to require any temperature compensation. The latter could be readily achieved by known methods. The servo access time increases from 390 to 450 ms. over the full head-travel of 40 in. as the temperature varies from 20° to 60° C. on the whole system. This is because the switching level of the diodes varies. The servo positioning accuracy if it were not disconnected would be 0.05% using the proper components.

When the voltage applied to the amplifier 32 is not limited, generally the carriage 14 is relatively close to its selected position, where it is desirable to provide the proper amount of damping. The reason for providing the proper amount of damping at this point is because the carriage 14 tends to pass its zero position and moves back and forth through this zero position. This period may be considered as the "settling down" period. Thus it is seen that the velocity voltage produced by the tachometer 20 which provides damping for the system is not limited during this time. At other times, as when the carriage 14 is seeking a new position and maximum movement of the carriage is desired, the sign change of the combined velocity and error signal will determine the breakpoint and the clipping diodes 48 and 50 will determine the maximum accelerating and decelerating torque.

It has been stated that it is desirable to have high gain within the servo loop in order to achieve high accuracy. Furthermore it is desirable to have high natural frequency in order to decrease the settling down time in case of overshoot. However, normally if the gain within a servo loop is too high, the system associated with the loop will tend to break into oscillations. In order to attain high servo loop gain and still minimize the likelihood of oscillations within the system, the capacitor 52 is included to provide a form of filter circuit. The capacitor 52 dampens any high frequency oscillations which tend to build up as a result of the high gain employed in the system. It allows, however, a relatively high natural frequency being comparable to the carrier frequency. Such high natural frequency may be associated with various mechanical elements within the system as, for example, the cable drive 24 or elements associated with the servo loops.

To achieve high gain a shaping network, i.e. a low pass filter is located in the error signal branch (a capacitor at the output of the summing network). Since the servo natural frequency is comparable to the carrier frequency the low pass filter will result in a considerable phase shift (about 25°) at the carrier frequency. To compensate for it the phase shift on the servo-motor fixed phase is so adjusted that the resulting phase shift between the fixed and controlled phases of the motor is 81° (instead of 90°) in small signal operation. In the saturated region, that is regions 66 and 68 of FIGURE 4, the altered resistance of the diodes causes the error signal phase to change, and the phase shift between the two motor windings becomes about 100° (instead of 90°). The resulting decrease in efficiency of motor performance is not large enough, however, to pose any further problems. In this way a high natural frequency and relatively high gain servo design is achieved at low carrier frequency.

Referring particularly to FIGURE 3, a curve 54 represents the velocity of a carriage versus distance along the axial length of a drum, as the carriage is traversed across a magnetic drum. The drum may be 40 inches in axial length, for example. Various breakpoints, such as points 56, 58, 60, and 62 are illustrated. A breakpoint is defined as a point at which a zero voltage is applied to the summing point 42 of FIGURE 2, for example, i.e. when the error positioning and the velocity voltages are equal and opposite. Various distances, designated as $d_d$, illustrates the total deceleration lengths occurring after the breakpoints. $d_d$ represents the distances travelled by the carriage after the motor driving voltage drops from its maximum limited value to zero.

The present invention has been designed to give 100% efficiency in providing maximum acceleration and deceleration of a carriage when movements involving distances greater than 30% of the total distance is involved. For distances involving less than 30% carriage movement with respect to the total length of the drum, the system while operating at less than 100% efficiency, nevertheless still operates at high efficiency. In a system such as described, the average transit time of the magnetic head carrying carriage is spent in movements involving more than 30% of the total distances involved. Consequently, little is lost if the maximum speed of the motor is not reached until 30% of the maximum travel is covered. These percentages have been and may be verified by study of use of various probability curves. It is not believed necessary to specifically discuss all the theory relating to the laws of probability which tend to prove the high degree of efficiency involved in a system utilizing the present invention. Efficiency of a system may in general be considered as the speed with which the system operates.

Referring particularly to FIGURE 4, a curve 64 represents a voltage which may appear at line 33 of the clipper and filter network 30. The curve 64 includes a portion 66 representing a negative voltage and a portion 68 representing a positive voltage. In the area between the portions 66 and 68, the diodes 46 and 48 of the clipper circuit (FIGURE 2) are non-conducting and are effectively out of the circuit. The voltage representing the area between the portions 66 and 68, designated $d_r$, is not clipped or limited and has a substantially linear characteristic. For purposes of clarity, only one curve 64 is illustrated, it being understood that similar voltage curves would result at various breakpoints in the positioning operation.

It is seen that this present invention has provided a relatively simple means for providing a stable servo of high gain and of natural frequency comparable to the carrier frequency. The system involving the present invention may therefore be operated with a relatively low carrier frequency, such as the commercially available 60 cycle signal. It applies a very simple servo control logic to determine the breakpoints of a saturated servo system having the characteristic of an on-off control system which results in the optimum system. At the same time, the present invention provides means for safely limiting the driving voltage which is applied to a driving motor.

What is claimed is:

1. In a carriage positioning system, a servo mechanism comprising a motor for driving said carriage during a positioning operation, a summing circuit, a source of velocity voltage representative of the velocity of said carriage during a positioning operation, a source of error positioning voltage representative of the distance between the position of said carriage and a position being sought by said carriage during said positioning operation, means for applying said velocity and said error positioning voltages to said summing circuit to produce a combined voltage, a limiting circuit including a pair of parallel diodes connected in polarity opposition across said summing circuit, a filter associated with said pair of diodes, and means for applying said combined voltage from said summing circuit to drive said motor, said diodes being normally conductive when said combined voltage exceeds a predetermined level and being non-conductive when said combined voltage drops below said predetermined level.

2. In a positioning system for positioning a head carrying carriage to a selected position with respect to a magnetic drum, a servo system comprising a motor for driving said carriage during a positioning operation, a summing circuit, a source of velocity voltage representative of the velocity of said carriage during a positioning operation, a source of error positioning voltage representative of the distance between the position of said carriage and a position being sought by said carriage during said positioning operation, said sources of voltage being of opposite polarity during the final stages of said positioning operation, means for applying said velocity and said error positioning voltages to said summing circuit to produce a combined voltage equal to the difference between said sources of voltage during the final stages of said positioning operation, a limiting circuit including a pair of parallel diodes connected in polarity opposition across said summing circuit, a filter associated with said pair of diodes, and means for applying said combined voltage from said summing circuit to drive said motor, said diodes normally being conductive when said combined voltage exceeds a predetermined level and being non-conductive when said combined voltage drops below said predetermined level.

3. The invention as set forth in claim 2 wherein said error positioning voltage is derived from a second summing circuit having an address signal voltage and a potentiometer positioning voltage applied thereto.

4. The invention as set forth in claim 3 wherein said velocity voltage is derived from a tachometer associated with said motor.

5. In a positioning system for positioning a head carrying carriage to a selected position with respect to a magnetic drum, a servo mechanism comprising a motor for driving said carriage during a positioning operation, a summing circuit, a tachometer associated with said motor to produce a velocity voltage representative of the velocity of said carriage during a positioning operation, a source of error positioning voltage representative of the distance between the position of said carriage and a position being sought by said carriage during said positioning operation, said error positioning voltage being derived from an address voltage source and a positioning potentiometer, means for applying said velocity and said error positioning voltages to said summing circuit to produce a combined voltage equal to the difference between said velocity and error positioning voltages during the final stages of said positioning operation, a limiter including a pair of parallel diodes connected in polarity opposition connected across said summing circuit, a filter including a capacitor associated with said limiter circuit, and means for applying said combined voltage from said summing circuit to drive said motor, said limiter circuit normally limiting said combined voltage to a predetermined level and being ineffective when said combined voltage drops below said predetermined level.

6. In a positioning system for positioning a head carrying carriage to a selected information track on a magnetic drum including a plurality of such information tracks, a servo mechanism comprising a motor for driving said carriage during a positioning operation, a summing circuit including a resistive network, a tachometer associated with said motor to produce a velocity voltage representative of the velocity of said carriage during a positioning operation, a source of error positioning voltage representative of the distance between the position of said carriage and a position being sought by said carriage during said positioning operation, said source of error positioning voltage including an address voltage source and a positioning potentiometer, means for applying said velocity and said error positioning voltages to said resistive network to produce a combined voltage equal to the difference between said velocity and error positioning voltages during the final stages of said positioning operation, a limiter including a pair of parallel diodes connected in polarity opposition connected across said summing circuit, a filter including a capacitor associated with said limiter circuit, and means for applying said combined voltage from said summing circuit to drive said motor, said limiter circuit normally limiting said combined voltage to a predetermined level and being ineffective when said combined voltage drops below said predetermined level.

7. In a positioning system for positioning a magnetic head carrying carriage to a selected information track on a magnetic drum including a plurality of such information tracks, a servo mechanism comprising a motor for driving said carriage during a positioning operation, a first summing circuit including a resistive network, a tachometer associated with said motor to product a velocity voltage representative of the velocity of said carriage during a positioning operation, a second summing circuit, an address voltage source for producing a voltage representative position of the information track being sought by said magnetic head during a positioning operation, a positioning potentiometer for producing a voltage representative of the actual position of said magnetic head during a positioning operation, a second summing circuit, means for applying the voltages from said address source and said positioning potentiometer to produce an error positioning voltage representative of the distance between said carriage and a position being sought by said carriage during a positioning operation, means for applying said velocity and said error positioning voltages to said resistive network to produce a combined voltage equal to the difference between said velocity and error positioning voltages during the final stages of said positioning operation, a limiter including a pair of parallel diodes connected in polarity opposition connected across said summing circuit, a filter including a capacitor associated with said limiter circuit, and means for applying said combined voltage from said summing circuit to drive said motor, said limiter circuit normally limiting said combined voltage to a predetermined level and being ineffective when said combined voltage drops below said predetermined level.

References Cited in the file of this patent

UNITED STATES PATENTS

| | | |
|---|---|---|
| 2,866,145 | Peaslee et al. | Dec. 23, 1958 |
| 2,901,680 | Goldman | Aug. 25, 1959 |
| 2,968,180 | Schafer | Jan. 17, 1961 |
| 3,054,924 | Wetzger et al. | Sept. 18, 1962 |

FOREIGN PATENTS

| | | |
|---|---|---|
| 678,520 | Great Britain | Sept. 3, 1952 |

OTHER REFERENCES

Servomechanism Practice by William R. Ahrendt, McGraw Hill Book Co. Inc., 1954, pages 87–95.